(12) United States Patent
Leung

(10) Patent No.: US 6,589,433 B2
(45) Date of Patent: Jul. 8, 2003

(54) ACCELEROMETER WITHOUT PROOF MASS

(75) Inventor: Albert M. Leung, Burnaby (CA)

(73) Assignee: Simon Fraser University, Burnaby (CA)

( * ) Notice: Subject to any disclaimer, the term of this patent is extended or adjusted under 35 U.S.C. 154(b) by 40 days.

(21) Appl. No.: 09/844,440

(22) Filed: Apr. 30, 2001

(65) Prior Publication Data
US 2002/0020689 A1 Feb. 21, 2002

Related U.S. Application Data

(63) Continuation-in-part of application No. 08/673,733, filed on Jun. 26, 1996, now abandoned.

(51) Int. Cl.$^7$ ............................. G01P 15/00; B81C 1/00
(52) U.S. Cl. ............................................. 216/2; 216/51
(58) Field of Search ................. 216/2, 11, 51, 216/56; 438/50, 54, 696

(56) References Cited

U.S. PATENT DOCUMENTS

| | | | |
|---|---|---|---|
| 2,440,189 A | 4/1948 | Zworykin | 318/648 |
| 2,455,394 A | 12/1948 | Webber | 338/43 |
| 2,650,496 A | 9/1953 | Middleton et al. | 73/204.15 |
| 2,709,365 A | 5/1955 | Piety | 73/152.33 |
| 2,726,546 A | 12/1955 | King, Jr. | 73/204.15 |
| 2,947,938 A | 8/1960 | Bennett | 324/706 |
| 3,114,261 A | 12/1963 | Dillon et al. | 73/861.71 |
| 3,241,374 A | 3/1966 | Menkis | 73/503 |
| 3,429,178 A | 2/1969 | Durbin | 73/23.21 |
| 3,677,085 A | 7/1972 | Hayakawa | 73/204 |
| 3,800,592 A | 4/1974 | Jones, Jr. | 73/181 |
| 3,881,181 A | 4/1975 | Khajezadeh | 357/69 |
| 3,975,951 A | 8/1976 | Kohama et al. | 73/116 |
| 3,992,940 A | 11/1976 | Platzer, Jr. | 73/204 |
| 3,995,481 A | 12/1976 | Djorup | 73/189 |
| 3,996,799 A | 12/1976 | van Putten | 73/204 |
| 3,998,928 A | 12/1976 | Stendel et al. | 423/155 |

(List continued on next page.)

FOREIGN PATENT DOCUMENTS

| | | | | |
|---|---|---|---|---|
| EP | 0 664 456 A1 | 7/1995 | | G01P/15/12 |
| EP | 0 674 182 A2 | 9/1995 | | G01P/15/12 |

OTHER PUBLICATIONS

Frank Goodenough, "Airbags Boom when IC Accelerometer Sees 50 G" Electronic Design, Aug. 8, 1991.
Euisik Yoon, Kensall D. Wise, An Integrated Mass Flow Sensor with On–Chip CMOS Interface Circuitry: IEEE Transactions on Electron Devices, vol. 39, No. 6, Jun. 1992, pp. 1376–1385.
Theresa A. Core, W.K. Tsang, Steven J. Sherman, "Fabrication Technology for an Integrated Surface–Micromachined Sensor" Solid State Technology Oct. 1993.
Bill Riedel, "A Surface–Micromachined, Monolithic Accelerometer ADXL50" Analog Dialogue; vol. 27, No. 2, 1993.
"Monolithic Accelerometer with Signal Conditioning", Analog Devices Data sheet for ADXL50, rev. 0, Jun. 1993.
Albert M. Leung, John Jones, Eva Czyzewska, Jianming Chen, Maria Pascal, "Micromachined Accelerometer With No Proof mass" International Electron Devices Meeting, Dec. 1997, pp. 899–902.

Primary Examiner—Anita Alanko
(74) Attorney, Agent, or Firm—Weingarten, Schurgin, Gagnebin & Lebovici LLP

(57) ABSTRACT

A process for fabricating an accelerometer, which includes providing a substrate with a layer of electrically conductive material on the substrate, micromachining the substrate to form a central electrical heater, a pair of temperature sensitive elements, and a cavity beneath the heater and the temperature sensing elements. Each temperature sensing element is spaced apart from said heater a distance in the range of 75 to 400 microns. The temperature sensing elements are located on opposite sides of the heater, thereby forming an accelerometer.

23 Claims, 10 Drawing Sheets

U.S. PATENT DOCUMENTS

| | | |
|---|---|---|
| 4,472,239 A | 9/1984 | Johnson et al. ............. 156/647 |
| 4,478,076 A | 10/1984 | Bohrer ........................ 73/204 |
| 4,478,077 A | 10/1984 | Bohrer et al. ................. 73/204 |
| 4,487,063 A | 12/1984 | Hopper ........................ 73/204 |
| 4,501,144 A | 2/1985 | Higashi et al. ............... 73/204 |
| 4,502,325 A | 3/1985 | Klomp ........................ 73/118 |
| 4,522,058 A | 6/1985 | Ewing ........................ 73/202 |
| 4,528,499 A | 7/1985 | Traub ......................... 324/62 |
| 4,542,650 A | 9/1985 | Renken et al. ................ 73/204 |
| 4,548,078 A | 10/1985 | Bohrer et al. ................. 73/204 |
| 4,581,928 A | 4/1986 | Johnson ...................... 73/204 |
| 4,624,137 A | 11/1986 | Johnson et al. .............. 73/204 |
| 4,624,138 A | 11/1986 | Ono et al. .................... 73/204 |
| 4,627,279 A | 12/1986 | Ohta et al. ................... 73/195 |
| 4,637,253 A | 1/1987 | Sekimura et al. ............. 73/189 |
| 4,651,564 A | 3/1987 | Johnson et al. .............. 73/204 |
| 4,677,850 A | 7/1987 | Miura et al. .................. 73/204 |
| 4,680,963 A | 7/1987 | Tabata et al. ................. 73/204 |
| 4,682,496 A | 7/1987 | Miura et al. .................. 73/204 |
| 4,685,324 A | 8/1987 | Bourdon et al. ................. 73/3 |
| 4,685,331 A | 8/1987 | Renken et al. ................ 73/204 |
| 4,686,856 A | 8/1987 | Vavra et al. ................... 73/204 |
| 4,693,115 A | 9/1987 | Tokura et al. ................ 73/204 |
| 4,693,116 A | 9/1987 | Miura et al. .................. 73/204 |
| 4,703,661 A | 11/1987 | Evers ...................... 73/861.66 |
| 4,735,086 A | 4/1988 | Follmer ...................... 73/204 |
| 4,739,651 A | 4/1988 | Smith ....................... 73/118.2 |
| 4,739,657 A | 4/1988 | Higashi et al. ............... 73/204 |
| 4,742,710 A | 5/1988 | Porth et al. ................. 73/118.2 |
| 4,742,711 A | 5/1988 | Porth et al. ................. 73/118.2 |
| 4,744,246 A | 5/1988 | Busta ......................... 73/204 |
| 4,864,855 A | 9/1989 | Shiraishi et al. ......... 73/204.21 |
| 5,438,871 A | 8/1995 | Hosoi et al. ............. 73/504.05 |
| 5,553,497 A | 9/1996 | Doi et al. ................ 73/504.06 |
| 5,581,034 A | 12/1996 | Dao et al. ................ 73/514.09 |
| 5,641,903 A | 6/1997 | Shinotuka et al. ....... 73/204.18 |
| 5,719,333 A | 2/1998 | Hosoi et al. ............. 73/514.05 |
| 5,786,744 A | 7/1998 | Nishio et al. ................. 338/14 |

ACCELEROMETER WITHOUT PROOF MASS

RELATED APPLICATIONS

The present application is a continuation-in-part of a continuing prosecution application filed Oct. 21, 1998 of application Ser. No. 08/673,733 filed Jun. 26, 1996, now abandoned.

FIELD

The present invention relates to a process for fabricating an accelerometer of a type having no proof or inertial mass and no moving parts or parts under stress such as piezo or strain gauge accelerometers.

BACKGROUND

Accelerometers find use in widely diverse applications including automobile air bags and suspension systems, computer hard disc drivers, smart detonation systems for bombs and missiles and machine vibration monitors. Silicon micromachined acceleration sensors are beginning to replace mechanical acceleration switches. Present accelerometers are all based upon the classical Newtonian relationship of force, F, mass, m, and acceleration, a, in which F=ma. Thus, for a cantilevered beam, the force due to acceleration causes the beam to deflect. This deflection is sensed either by sensing the change in piezo resistance or by a change in capacitance. Such systems are not stable over wide temperature ranges and have a response which peaks due to insufficient mechanical damping.

One form of accelerometer made by bulk micromachining consists of membrane or diaphragm of silicon formed by chemical etching having a large mass of silicon at the centre and tethers of thin film piezo-resistors, whose resistance is sensitive to strain and deformation, suspending the mass. Acceleration causes the large silicon mass to move, deforming the diaphragm and changing the resistance of the piezo-resistors. Such bulk micromachined devices are large by integrated circuit standards and consistent with semiconductor circuit fabrication techniques.

Another system made by surface micromachining is based on a differential capacitor. Surface micromachining creates much smaller, more intricate and precisely patterned structures than those made by bulk micromachining. It involves the same process that is used to make integrated circuits, namely, depositing and etching multiple thin films and layers of silicon and silicon-oxide to form complex mechanical structures. In this case a central beam is affixed in an "H" configuration with the spaced apart parallel arms of the "H" supporting respective ends of the cross beam.

A plate affixed perpendicular to the beam forms a moving capacitor plate that is positioned between two fixed plates, thus, forming two capacitors sharing a common moving plate. When the unit is subjected to an accelerating force the beam and hence moving plate moves closer to one of the fixed plates and away from the other fixed plate. The effect is to reduce one of the capacitors and increase the other by an amount proportional to the acceleration. The device requires proper orientation with the cross beam parallel to the direction of acceleration. However, surface micromachining is used to create a much smaller device adapted to the same techniques used to make integrated circuits. The moving capacitor plate accelerometer suffers from high noise and exhibits drift at low acceleration measurements.

It is an object of the present invention to provide an improved accelerometer. It is a further object of the invention to provide an accelerometer having no proof mass and a corresponding increase in ruggedness.

SUMMARY OF THE INVENTION

According to the invention there is provided a process for fabricating an accelerometer which includes providing a substrate with a layer of electrically conductive material on the substrate, micromachining the electrically conductive material to form a primary heater and a pair of temperature sensitive elements, one located on each side of and spaced apart from said electrically conductive primary heater a distance in the range of 75 to 400 microns, and micromachining the substrate to form a cavity below the heater and the temperature sensitive elements, thereby forming the accelerometer.

In Applicant's parent application a spacing between each temperature sensitive element and the primary heater was 20 microns. A vastly improved sensitivity is realized by increasing this spacing to be in the range of 75 to 400 microns.

In yet another aspect of the invention there is provided a process for fabricating an accelerometer which includes heating an n-type silicon substrate at a dielectric forming temperature sufficiently high to form a first dielectric upon the substrate. This step is followed by depositing a layer of electrically conductive material over the first dielectric layer. Next a second dielectric layer is formed over the layer of electrically conductive material, and the second dielectric layer is patterned over the layer of electrically conductive material to form three spaced apart bridges. The layer of electrically conductive material is etched using the second dielectric layer as a mask down to the first dielectric layer covering the substrate, such that a central bridge of the three spaced apart bridges of electrically conductive material corresponds to a primary electric heater and the other two of said bridges correspond to a pair of temperature sensing elements, one on each side of the primary electric heater and spaced from said central heater a distance of 75 to 400 microns. Next the substrate is heated so as to oxidize the side walls of the electrically conductive material in the bridges, patterning and etching the first and second dielectric layer above and below said bridges to create openings for bonding pads and to expose said substrate for formation of a space below said bridges and finally a space below said bridges is formed by patterning and etching.

BRIEF DESCRIPTION WITH REFERENCE TO THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

Figure 14:
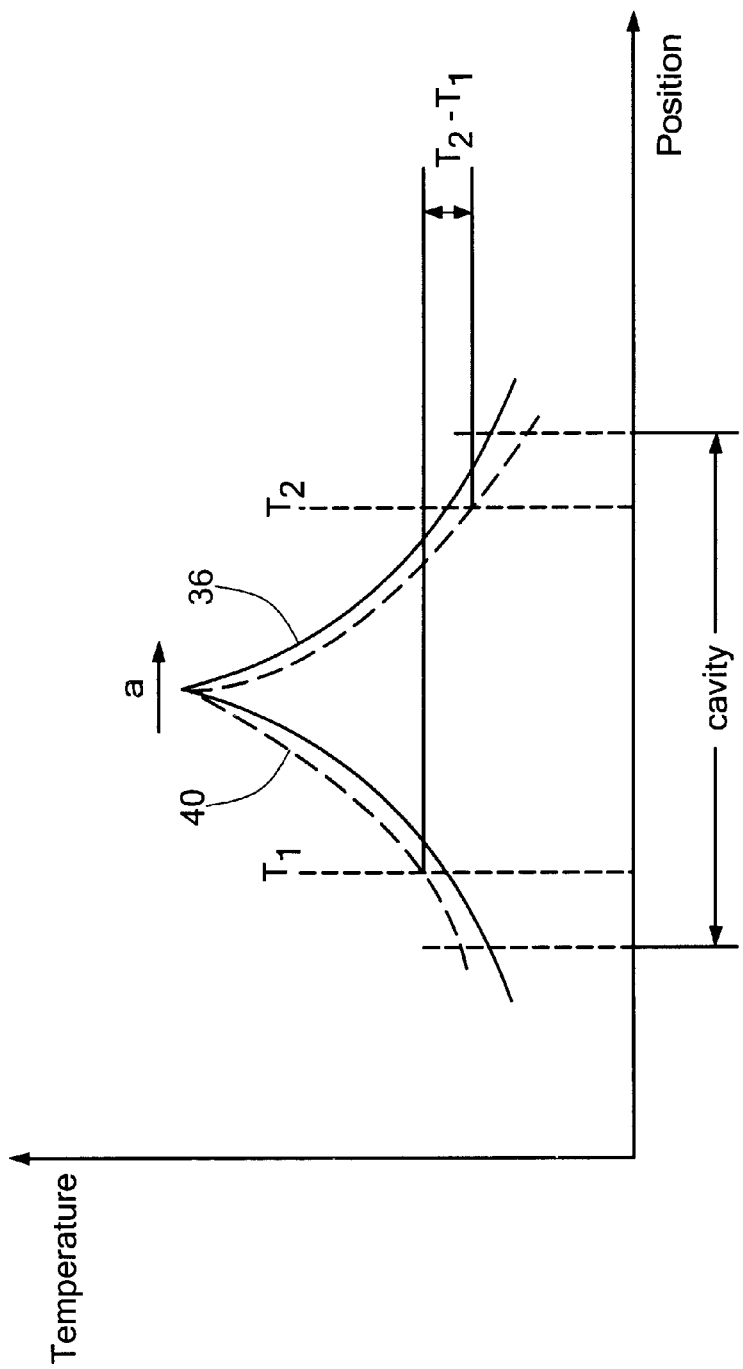
Figure 15A:
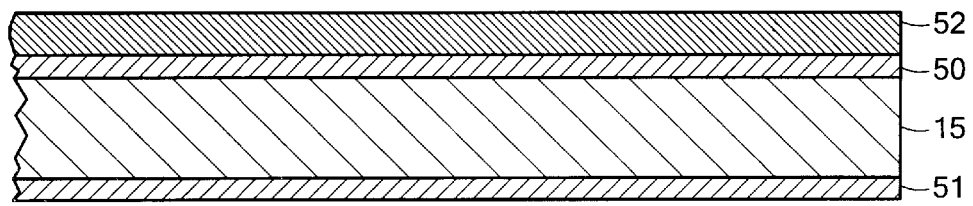
Figure 15B:
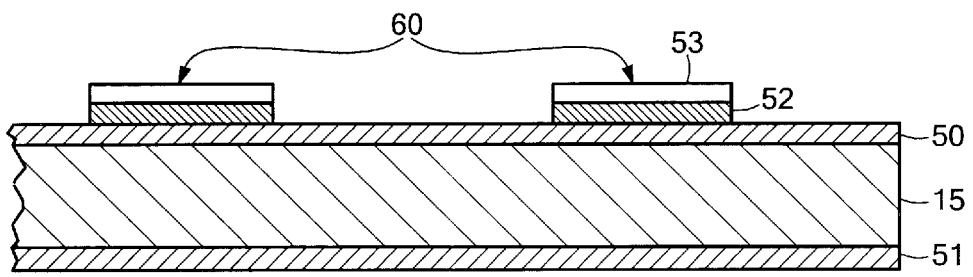
Figure 15C:
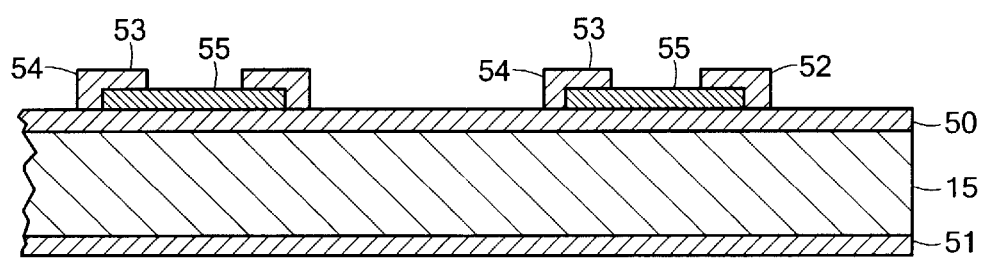
Figure 15D:
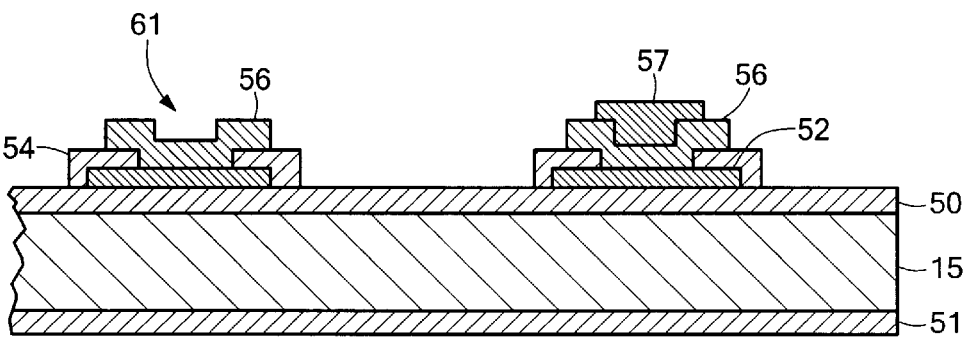

FIG. 14 depicts the temperature gradient in the cavity caused by the primary heater carrying current. Also shown is the shifted temperature gradient, which occurs when the sensor is accelerated; and FIGS. 15-a, 15-b, 15-c, and 15-d depict the surface micromachining process by which a conductive surface feature is imparted onto the silicon wafer and then it is further processed to become a bonding pad or a thermocouple junction.

DETAILED DESCRIPTION WITH REFERENCE TO THE DRAWINGS

Figure 1:
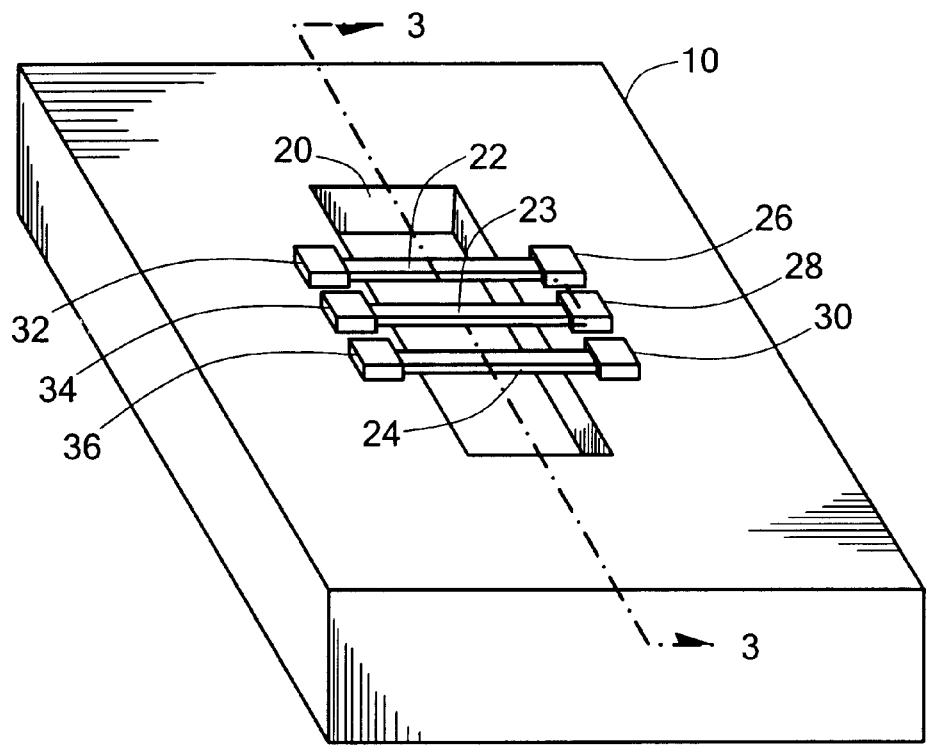
FIG. 1 is a perspective view of a preferred embodiment of the accelerometer.
Figure 2:
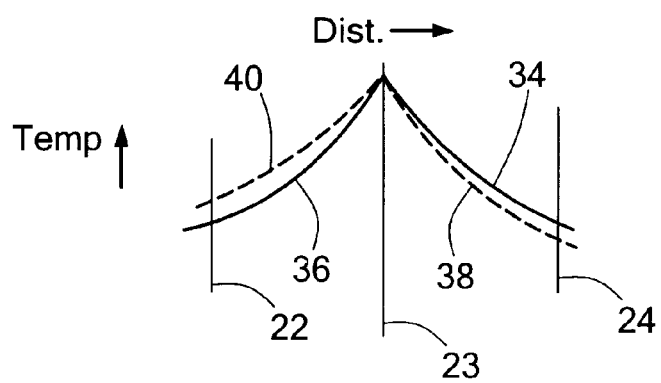
FIG. 2 is a graph showing the normal temperature gradient and the temperature gradient shift due to acceleration.

Referring to FIG. 1 the accelerometer is formed on a silicon substrate 10 in which a cavity 20 is formed underneath a central heater 23 and sensors 22 and 24 positioned at equal distances from the heater 23 on either side thereof. Wire bonding pads 28 and 34 are formed on either end of the heater 23 to provide electrical contact thereto. Wire bonding pads 26 and 32 are formed on either end of sensor 22 and wire bonding pads 30 and 36 are formed on either end of sensor 24 also to provide electrical contact. Electrical current is passed through the heater 23 which heats the air around it. The temperature gradient established is shown by the solid lines 34 and 36 in FIG. 2. Resistive temperature sensors 22 and 24 are used to measure the temperature of the surrounding air. The distance between the heater 23 and each sensor is 200 microns but may be in the range of 75 to 400 microns while heater 23 is 10 to 15 microns wide. The length of the heater 23 and sensors 22 and 24 is 500 microns but can be as long as 2000 microns. However, other dimensions may be selected depending upon the desired specifications of operation.

With the sensors 22 and 24 equidistant from the heater 23 the differential temperature between the sensors 22 and 24 will be zero. If the substrate 10 is subjected to an accelerating force in a direction perpendicular to the heater 23 but along the surface of the substrate, the temperature distribution of the air will shift as shown in the dotted lines 38 and 40. In this case sensor 22 will experience an increase in temperature whereas sensor 24 will detect a reduced temperature, giving a net non-zero differential temperature measurement between the sensors 22 and 24 of a magnitude which is proportional to acceleration. For the device to operate properly it is placed in a sealed chamber so that the temperature gradient will not be disturbed by external air current or flow.

Figure 3:
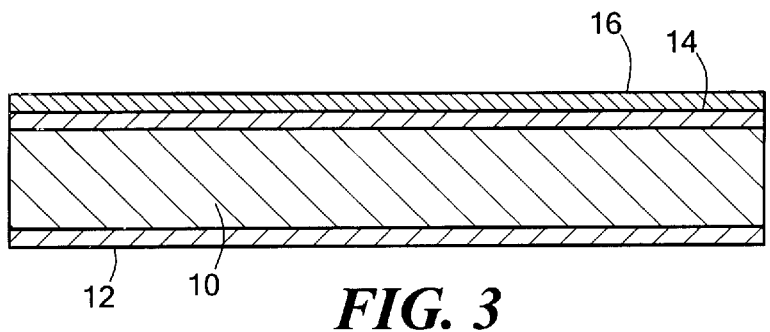
FIGS. 3 to 6 are sectional views showing the steps in fabricating the device of FIG. 1 taken along the line 3—3.
Figure 4:
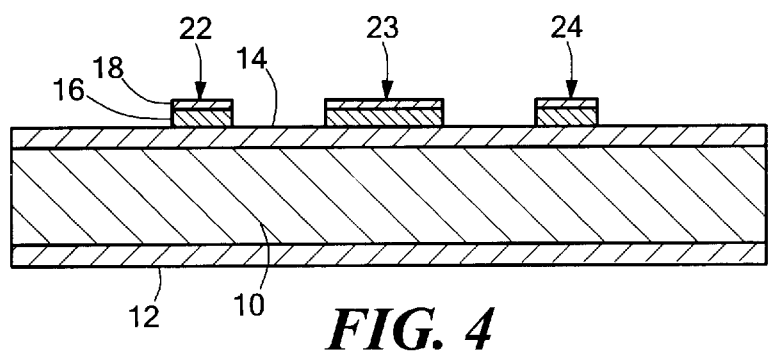

Referring to FIG. 3, the silicon wafer 12 is n-type. Thermal oxidation at 1,100° C. produces a layer of silicon dioxide 14 0.5 μm thick. On top of the layer of silicon dioxide 14 a layer of polysilicon 16 0.8 μm thick is deposited. The polysilicon layer 16 is lightly doped to increase its electrical conductivity. Following this doping, another oxidation step is used to develop a 0.5 μm thick layer of silicon dioxide 18 on top of the polysilicon 16 reducing the thickness of the polysilicon layer to 0.5 μm. Standard photolithographic techniques are used to pattern the silicon dioxide layer 18 over the polysilicon 16 as seen in FIG. 4. The silicon dioxide 18 is used as an etch mask for the removal of exposed polysilicon using ethylenediamine-pyrocatechol-water (EDP) mixture as an etchant at 85° C. Oxide 14 underneath the polysilicon 16 protects the silicon substrate 10 during etching. The resulting structure after etching shown in FIG. 4 defines three polysilicon bridges that are used as the heater 23 and the two sensors 22 and 24.

Figure 5:
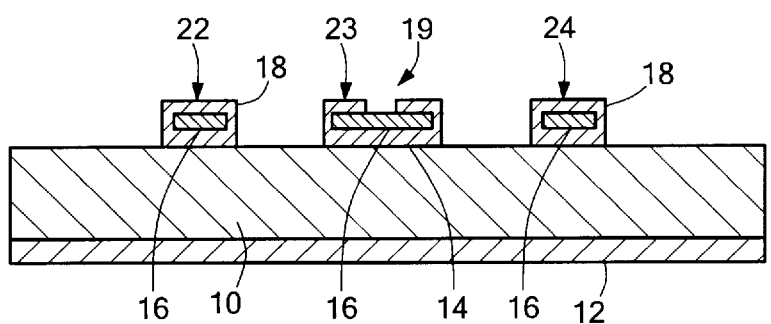
Figure 6:
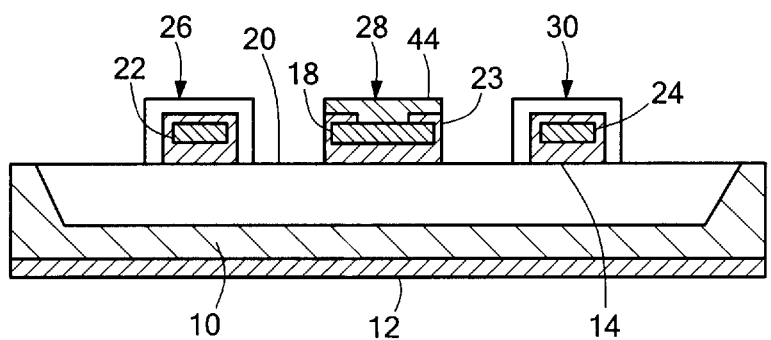

Another oxidation step produces oxide on the side walls of the polysilicon 16 to protect it from a later silicon etch. The oxide layers above and below the polysilicon layer 16 are patterned to create openings 19 for the bonding pads 26, 28, 30, 32, 34 and 36 and formation of the cavity 20 in the silicon substrate as shown in FIG. 5.

An aluminum nickel seed layer is sputtered onto the wafer and photoresist is patterned so the exposed bonding pad area can be selectively plated with gold. The photoresist and seed layer are removed and the wafer is etched in EDP to create a deep cavity 20 underneath. During EDP etching of the silicon substrate 10, the polysilicon bridges 22, 23, and 24 are protected by the oxide layers, and the polysilicon 16 underneath the bonding pads 26, 28, 30, 32, 34, and 36 is protected by gold plated pads 44.

The fabrication process is compatible with CMOS and bipolar processes. This allows the accelerometer to be integrated with signal conditioning circuits.

Figure 7:
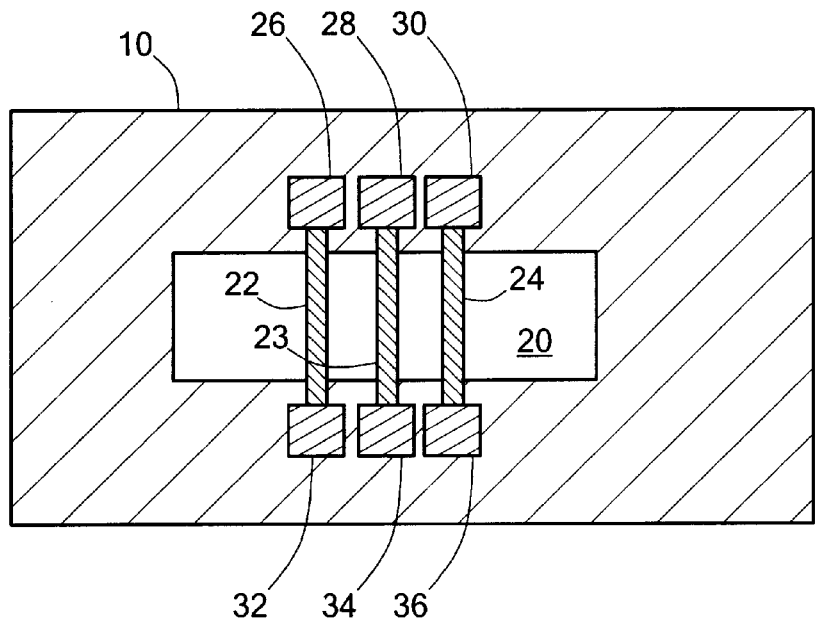
FIG. 7 is a plan view of the device.

Referring to FIG. 7, the final device consists of three elongated strips each of which consists of a layer of polysilicon sandwiched between layers of oxide 22, 23, 24 coupled to their respective bonding pads and suspended over a cavity 20. The space around the heater 23 and temperature sensors 22 and 24 is filled with either a fluid or a gas. Although polysilicon has been described as the material of which the heater 23 and sensors 22 and 24 are made, thin film metal resistors such as nickel, chromium, gold or platinum can be used.

Figure 8:
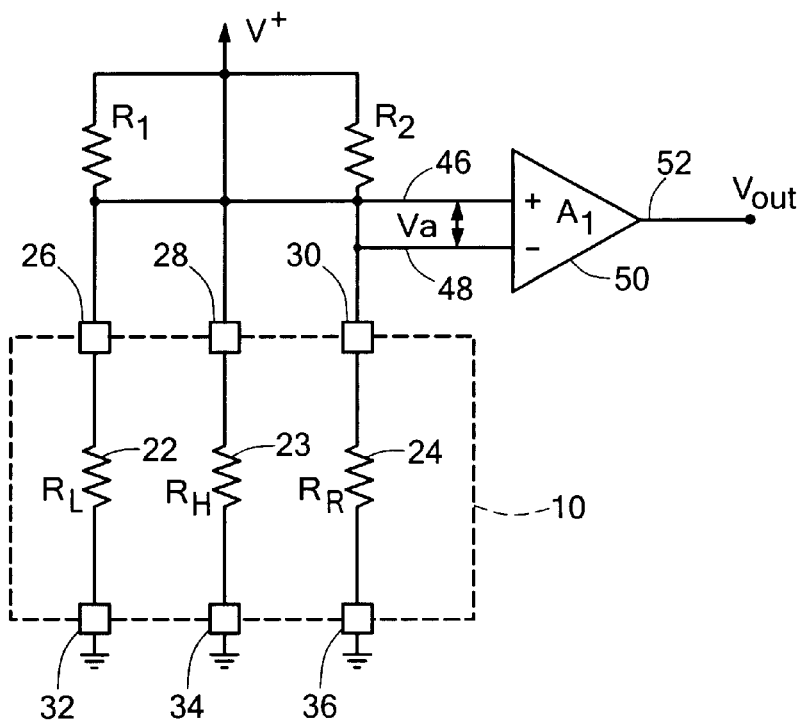
FIG. 8 is a schematic diagram of the circuitry used with the accelerometer.

Heater 23 is used in a bridge circuit formed by resistors R1, R2, $R_L$, and $R_R$ shown in FIG. 8. The junctions of the bridge are sampled by lines 46 and 48 and fed into the input of a differential amplifier 50 which provides an output on line 52. When acceleration is applied, the balance of the bridge is disturbed causing a differential voltage to be applied to the amplifier 50. The amplifier 50 converts the differential signal to a single-ended voltage at its output on line 52. With R1=R2, and no acceleration, $V_a$=0. When acceleration is applied this balance is disturbed and the differential voltage $V_a$ is amplified and converted into a single-ended signal by the differential amplifier 50.

Although micromachining was described as the technology used to produce this accelerometer, there are other low cost manufacturing technologies that can also be used. In order to maximize the differential temperature change of the sensors 22 and 24 the direction of acceleration is perpendicular to the heater 23 and along the surface of the substrate 10. Acceleration perpendicular to the surface of the substrate will cause a shift in the temperature gradient but will affect each sensor in the same way. However, a measurement of the change in the temperature of each sensor will allow a determination of the temperature change of each sensor 22 and 24.

Figure 9:
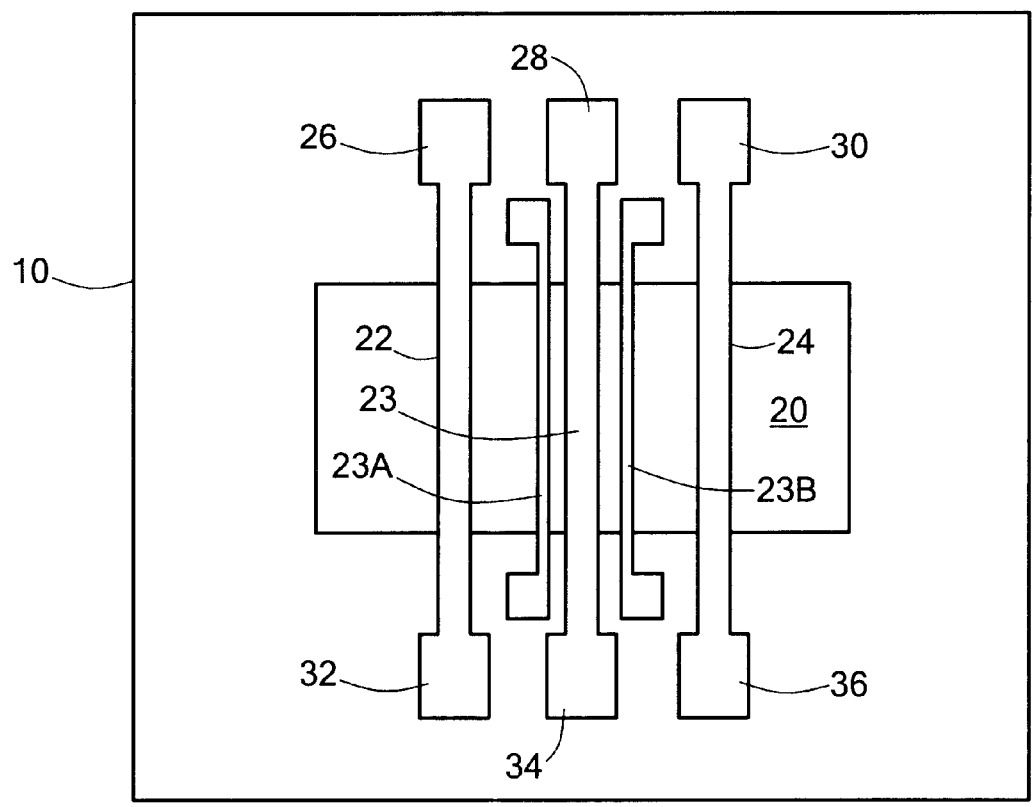
FIG. 9 is a top or plan view of the device incorporating two auxiliary heaters for self-testing.

Referring to FIG. 9, a self-testing capability can be implemented by the addition of two auxiliary heaters 23A and 23B, one on each side of main heater 23. In normal operation, all three heaters 23, 23A, and 23B are powered to produce a symmetrical temperature gradient which is disturbed only by acceleration. By switching off one of the auxiliary heaters 23A or 23B, this symmetrical temperature gradient is disturbed. For example, when auxiliary heater 23A is switched off, the point of symmetry of the temperature gradient will shift from the center of heater 23 towards sensor 24 without application of an acceleration. This change will produce an output to indicate that the accelerometer's function is intact. Switching off heater 23B has a similar effect but in the opposite direction. Instead of cutting of the current completely, a more elaborate testing can be done by controlling the amount of current reduction to anywhere between 0 and 100%.

Obviously, two or three accelerometers oriented at right angles to each other could be used to sense acceleration in two dimensions or three dimensions, respectively, rather than having to orient the accelerometer in the direction of the acceleration.

Figure 10:
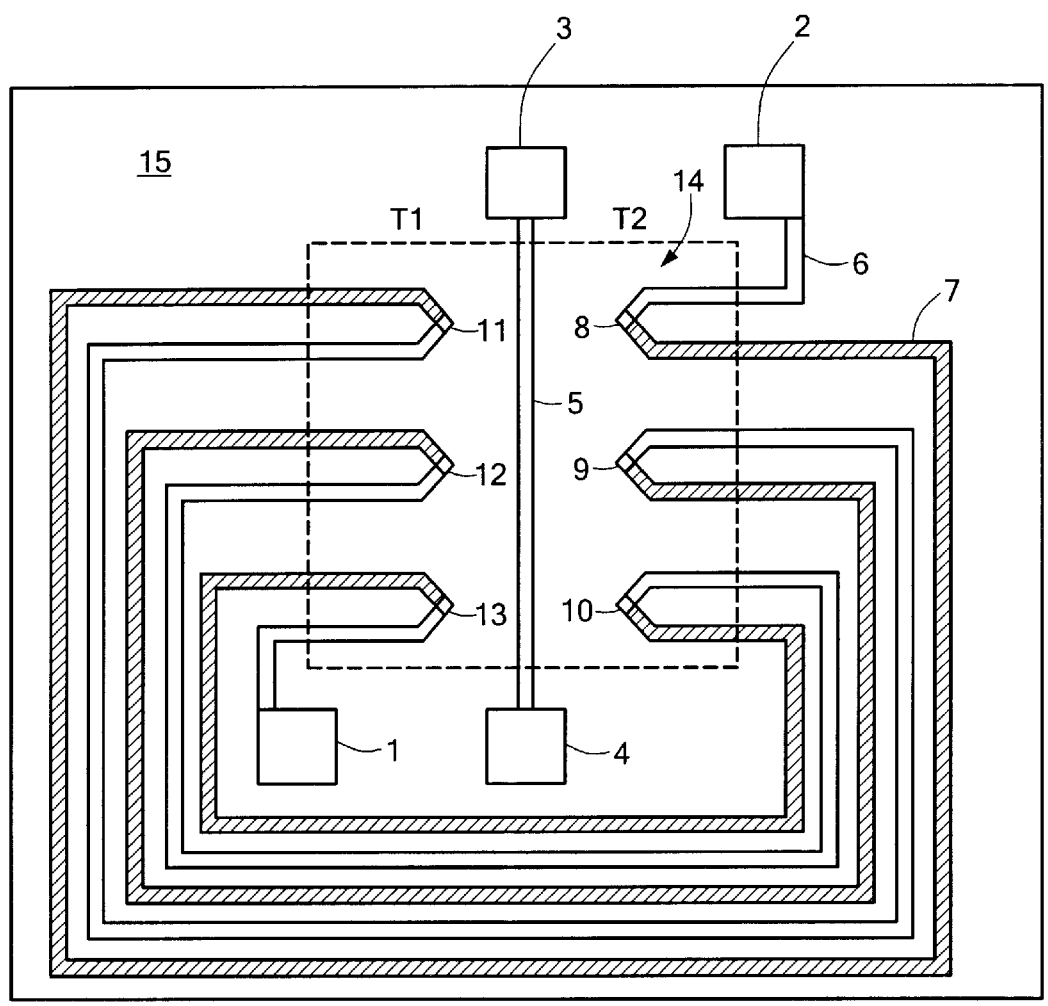
FIG. 10 depicts a first embodiment of the invention showing an arrangement of thermopiles (linearly oriented thermocouple arrays) spaced symmetrically on either side of a cavity.

Referring to FIG. 10, the accelerometer is formed on a silicon substrate 15 in which a cavity 14 is formed. A central primary heater 5 and two thermopiles span the cavity. The thermopiles are arrays of thermocouple junctions (8, 9, 10 and 11, 12, 13) positioned at equal distances from the primary heater 5 on either side thereof and oriented substantially parallel to the primary heater 5. The distance between the primary heater 5 and each of the thermocouple junction arrays is about 200 microns, while the primary heater 5 is about 10 to 15 microns in width. The length of the primary heater 5 is in the neighborhood of 500 microns. However, other dimensions may be selected depending upon the desired specifications of operation. Bonding pads 3 and 4 are positioned on either end of the primary heater 5 to provide electrical contact thereto. Bonding pads 1 and 2 are also formed at the ends of the thermocouple junction arrays (8, 9, 10 and 11, 12, 13) to provide electrical contact. FIG. 10 (and all of the other drawings in this application) depicts the thermopiles with a small number of thermocouple junctions, but, in practice, a significantly greater number of thermocouple junctions (usually 10 or more) are used for each thermopile to increase the temperature measuring sensitivity of the device.

During operation, electrical current from an external source (not shown) is passed through the primary heater 5 via bonding pads 3 and 4. The primary heater 5 warms the air around it, forming a temperature gradient 36 shown in FIG. 14. The thermopiles on either side of the primary heater 5 are used to measure the temperature of the surrounding air.

A thermopile is an array of thermocouple junctions, and each thermocouple is a combination of two different conductors (or semiconductors) 6 and 7, which produces a potential difference at the junction between the two materials. The potential generated is proportional to the temperature at the junction. At a given temperature (T), each of the thermocouple junctions 8, 9, 10, 11, 12, 13 will produce an electrical potential (V) given by the expression: $V = \alpha_z T$ where $\alpha_g$ is the Seeback coefficient. Materials with a positive contribution to the Seeback coefficient should be used for the first material 6, so as to maximize the sensitivity of the junction. Such materials include: p-doped polysilicon, antinomy, chrome, gold, copper, silver and others. Conversely, materials with a negative contribution to the Seeback coefficient such as: n-doped polysilicon, lead, aluminum, platinum, nickel, bismuth and others should be employed for material 7.

Multiple thermocouple junctions 8, 9, 10, 11, 12, 13 are positioned on either side of the cavity 14, forming thermopiles with linear orientations that are equidistant from and substantially parallel to the primary heater 5. Electrically, the thermocouple junctions 8, 9, 10, 11, 12, 13 are connected in series with opposing polarity on either side of the primary heater 5. The resulting voltage measured across bonding pads 1 and 2 is a signal which represents the difference in temperature between the two thermopiles.

For the configuration shown in FIG. 10, the output voltage between bonding pads 1 and 2 ($V_{2,1}$) will be the sum of the voltages developed across junctions 8, 9, and 10 minus the sum of the voltages developed across junctions 11, 12, and 13. In other words:

$$V_{2,1} = V_8 + V_9 + V_{10} - (V_{11} + V_{12} + V_{13})$$

where $V_i$ is the voltage at junction i, $$V_{2,1} \alpha_a (T_8 + T_9 + T_{10} - T_{11} - T_{12} - T_{13})$$

$T_i$ represents the temperature at a junction i. Assuming now that the primary heater 5 creates a symmetrical temperature distribution, then $$T_2 = T_8 = T_9 = T_{10} \text{ and } T_1 = T_{11} = T_{12} = T_{13}$$

and so, more generally, $$V_{2,1} = N \alpha_c (T_2 - T_1)$$

where N is the number of thermocouple junctions in each thermopile.

Figure 11:
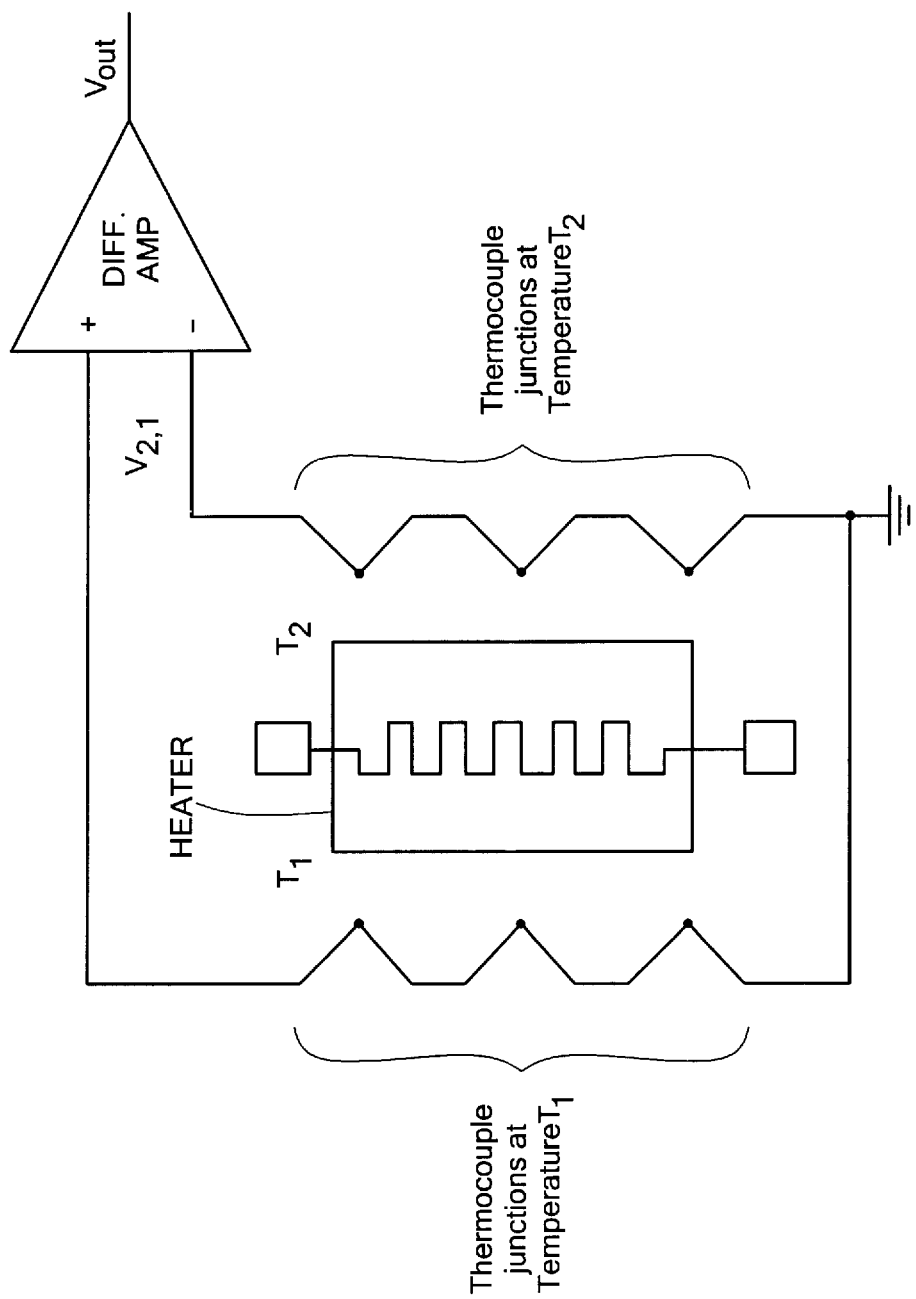
FIG. 11 depicts the overall system showing the amplifier which amplifies the differential signal from the thermopiles.

Referring to FIGS. 10 and 14, under normal conditions (i.e. no acceleration), the temperature distribution 36 in the cavity will be symmetric about the primary heater 5 and $T_1$ will equal $T_2$, forcing $V_{2,1}$ to zero. However, if there is an acceleration of the device, then the temperature gradient 40 in the cavity will be shifted slightly and $V_{2,1}$ will be non-zero. Over a range of accelerations, the shift in the temperature distribution and thus, the differential voltage ($V_{2,1}$), is proportional to the acceleration of the device. FIG. 11 shows how this differential voltage signal $V_{2,1}$ can be amplified to produce an output voltage ($V_{out}$), which is proportional to the acceleration of the device.

Figure 12:
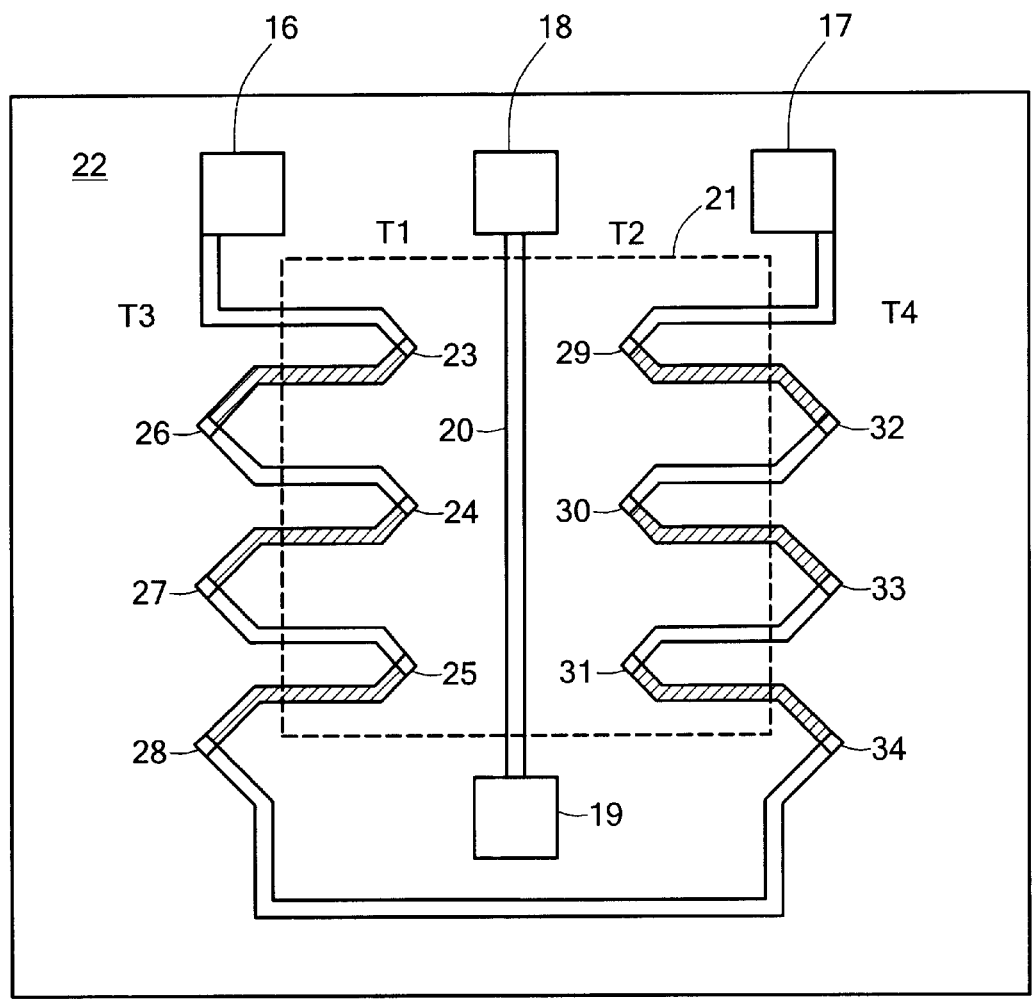
FIG. 12 depicts a second embodiment of the invention showing an alternative arrangement of thermopiles spaced symmetrically on either side of a cavity.
Figure 13:
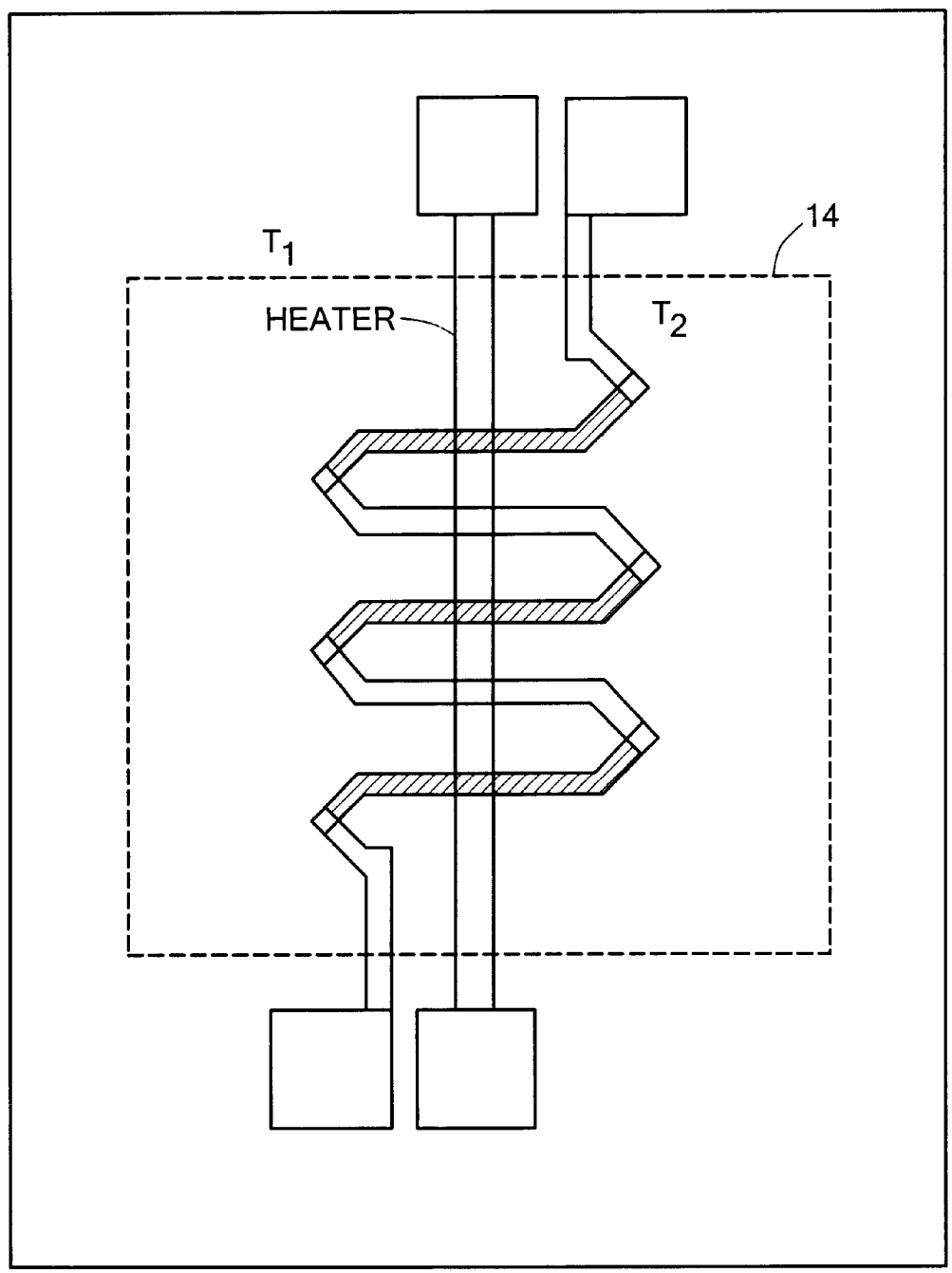
FIG. 13 depicts a third embodiment of the invention showing another alternative arrangement of thermopiles spaced symmetrically on either side of a cavity.

When the number of thermocouples in the device is increased, the routing of conductive materials shown at the bottom of FIG. 10 can become prohibitive. Alternative embodiments which help to reduce this routing problem are depicted in FIGS. 12 and 13. Referring now to FIG. 12, the general equation relating the output voltage $V_{2,1}$ is given by:

$$V_{2,1} V_{29} + V_{30} + V_{31} - V_{32} - V_{33} - V_{34} + V_{26} + V_{27} + V_{28} - V_{23} - V_{24} - V_{25}$$

or more generally,
$V_{2,1} = N\alpha_a(T_2 + T_3 - T_1 - T_4)$ where N is the number of thermocouple junctions in each of the four thermopiles. Since the junctions 26, 27, 28, 32, 33, and 34 are on the silicon substrate 15 which has good thermal conductivity, $T_3$ and $T_4$ should both remain at the substrate temperature, leaving $$V_{2,1} = N\alpha_5(T_2 - T_1)$$

Referring now to FIG. 13, a third configuration is shown, wherein the output voltage $V_{2.1}$ is given by:

$$V_{2,1}=V_{41}+V_{42}+V_{43}-V_{44}-V_{45}-V_{46}$$

$V_{2.1}=N\alpha_c(T_2-T_1)$ where N is the number of thermocouple junctions in each of the thermopiles in the cavity 14.

To minimize the heat conduction from the primary heater to the thermocouple junctions, thin (less than 0.5 micron) and narrow structures are used to support the thermopile. The configuration shown in FIG. 13 has the advantage of having the shortest conductor path, resulting in the lowest source resistance and thermal noise.

Several other features may be included in the device, which are not shown in the diagrams. A pair of auxiliary heaters may be added on each side of the primary heater between the primary heater and the thermopiles. These auxiliary heaters may have current passed through them so as to produce an asymmetric temperature distribution. The asymmetric temperature distribution will affect $V_{2,1}$ because of the differential temperature measured by each thermopile. Elaborate testing can be carried out by varying the current flow to the auxiliary heaters between 0–100% to ensure the proper functionality of the device.

Another embodiment, not depicted in the drawings, involves making absolute (rather than differential) voltage measurements for each of the thermopiles on either side of the cavity and then using external electronics to achieve the differential signal. For example, referring to FIG. 10, the voltage from thermocouple junctions 8, 9, and 10 can be determined.

$$V_2=V_8+V_9+V_{10}=\alpha_8(T_8+T_9+T_{10})=N\alpha_cT_2 \text{ (applying all previous assumptions)}$$

and the voltage across thermocouple junctions 11, 12, and 13 can be determined, $$V_1=N\alpha_cT_1$$

After having determined $V_1$ and $V_2$, the differential voltage $V_{2.1}$ may be calculated using external circuitry such as a difference amplifier, $$V_{2,1}=N\alpha_c(T_2-T_1)$$

Obviously, two or three accelerometers oriented at right angles to each other could be used to sense acceleration in two or three dimensions respectively. Use of multiple accelerometers would eliminate having to orient the accelerometer in the direction of the acceleration. FIGS. 15-a and 15-b depict the surface micromachining process by which a conductive surface feature 60 is imparted onto the silicon wafer 16. Referring to FIG. 15-a, the silicon wafer 15 is n-type. Thermal oxidation at approximately 1,100° C. produces layers of dielectric silicon dioxide 50 and 51 on either side of the substrate 15, which are approximately 0.5 microns thick. A layer of 0.8 micron thick polysilicon 52 is then deposited on top of the dielectric oxide layer 50. The polysilicon layer 52 is lightly doped to increase its electrical conductivity.

As shown in FIG. 15-b, a second oxidation step is used to produce another 0.5 micron oxide layer 53 in selected areas. The silicon oxide layer 53 reduces the thickness of the polysilicon layer 52 to 0.5 microns in those areas. Standard photolithographic techniques are employed to pattern the second oxide layer 53, so that it is only deposited on the desired areas. The patterned silicon dioxide layer 53 is then used as an etch mask to pattern the polysilicon layer 52 underneath. Exposed polysilicon from layer 52 is removed by etching, leaving the conductive surface features 60.

FIGS. 15-c and 15-d depict the surface micromachining process by which a thermocouple junction 61 is formed from a conductive surface feature 60 (see FIG. 15-b). A third oxidation step is sued to impart side walls 54 onto the exposed polysilicon layer 52. A second lithographic step is used to open windows 55 on the top oxide layer 53 for thermocouple contact and bonding pad area. A window for the cavity (not shown) may also be opened in this lithographic step. A layer of nickel 56 is deposited on the wafer in selected areas. The nickel 56 and the polysilicon 52 become a thermocouple junction 61. Selective plating can also be used to form a bonding pad 57 for electrical connection.

A final processing step involves the etching of the silicon substrate 15 to produce a cavity (not shown). Tetramethylammonium hydroxide (TMAH) etchant is ideal for this application because silicon dioxide and many thin film metals such as nickel, chromium, gold etc. are resistive to this etchant.

The technique for micromachining the accelerometer structure is compatible with both CMOS and bipolar processes allowing the accelerometer to be integrated with signal conditioning circuits.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A process for fabricating an accelerometer, comprising:
   (a) providing a substrate with a layer of electrically conductive material on said substrate;
   (b) micromachining said substrate to form a central electrical heater, a pair of temperature sensitive elements, and a cavity beneath said heater and said temperature sensing elements, each temperature sensing element being spaced apart from said heater a distance in the range of 75 to 400 microns and said temperature sensing elements located on opposite sides of said heater, thereby forming an accelerometer.

2. A process according to claim 1, wherein said pair of temperature sensitive elements are parallel to and equally spaced from said heater.

3. A process according to claim 1, wherein said temperature sensitive elements are temperature sensitive resistors.

4. A process according to claim 1, including providing an electrical conductor connectable to an external source of power operative to conduct electric current through said heater so as to develop a symmetrical temperature gradient extending outwardly from said heater on either side thereof.

5. A process according to claim 1, including providing a bridge circuit operative to measure the differential resistance of said temperature sensitive elements.

6. A process according to claim 1, wherein said primary heater and said temperature sensitive elements are coated with silicon dioxide.

7. A process according to claim 1, including providing a pair of auxiliary heaters symmetrically disposed on either side of and spaced from said primary heater.

8. A process according to claim 1, including:
(a) connecting a conductor to an external source of power so as to conduct current through said primary heater in order to develop a symmetrical temperature gradient in the air surrounding said primary heater in which the air temperature lowers in a direction away from said primary heater; and
(b) measuring the differential resistance of said temperature sensitive elements with a bridge circuit and relating the differential resistance to acceleration in a direction transverse to said temperature sensitive elements and along the surface of said substrate.

9. A process according to claim 1, wherein said primary heater and said sensors as polysilicon.

10. A process according to claim 7, wherein said auxiliary heaters are intermediate said temperature sensitive elements and said primary heater.

11. A process according to claim 7, including providing conductive lines coupled to said auxiliary heaters and to an external source of power and operative to permit independent changing of current through each of said auxiliary heaters.

12. A process according to claim 1, wherein said temperature sensing elements are thermopiles, said thermopiles arranged linearly and substantially parallel to a first direction and located at two positions equidistant from and on either side of said primary heater, each one of said thermopiles being operative to produce an electrical potential proportional to the temperature at one of said two positions.

13. A process according to claim 12, wherein said thermopiles are electrically connected in series and with opposite polarity, such that the electrical potential produced across the combination of both thermopiles is proportional to the difference in temperature between said two positions.

14. A process according to claim 11, including providing a conductive path coupled to said thermopiles and to an external meter for permitting measuring the electrical potential produced by said thermopiles and relating that to acceleration in a second direction transverse to said temperature sensitive elements and along a surface of said substrate.

15. A process according to claim 12, including providing a differential amplifier coupled to said thermopiles and providing an output for measuring the electrical potential produced by said thermopiles.

16. A process according to claim 12, wherein each of said thermopiles is comprised of a plurality of thermocouples, each of said thermocouples being made out of a first material and a second material, which first and second materials form a thermocouple junction in a location where they are joined, each of said thermocouple junctions operative to produce an electrical potential proportional to the temperature at said thermocouple junction, said plurality of thermocouple junctions being physically arranged in a linear pattern and electrically coupled in series so as to form an array of thermocouple junctions.

17. A process for fabricating an accelerometer, comprising:
(a) heating an n-type silicon substrate at a dielectric forming temperature sufficiently high to form a first dielectric upon said substrate;
(b) depositing a layer of electrically conductive material over said first dielectric layer;
(c) forming a second dielectric layer over the layer of electrically conductive material;
(d) patterning the second dielectric layer over the layer of electrically conductive material to form three spaced apart bridges;
(e) etching the layer of electrically conductive material using the second dielectric layer as a mask down to the first dielectric layer covering said substrate, such that a central bridge of said three spaced apart bridges of electrically conductive material corresponds to a central electric heater and the other two of said bridges correspond to a pair of temperature sensing elements, one on each side of said central electric heater and spaced from said central heater a distance of 75 to 400 microns;
(f) heating the substrate so as to oxidize the side walls of the electrically conductive material in said bridges;
(g) patterning and etching the first and second dielectric layer above and below said bridges to create openings for bonding pads and to expose said substrate for formation of a space below said bridges; and
(h) patterning and etching a space below said bridges.

18. A process according to claim 17, wherein said pair of temperature sensitive elements are parallel and equally spaced from said central electric heater.

19. A process according to claim 17, wherein said first dielectric and second dielectric layers are silicon dioxide.

20. A process according to claim 17, wherein said space below said bridges is a cavity.

21. A process according to claim 17, wherein said electrically conductive material is doped polysilicon.

22. A process according to claim 17, wherein said electrically conductive material is selected from the group consisting of nickel, chromium, gold and platinum.

23. A process according to claim 17, including forming an auxiliary bridge symmetrically disposed on each side of a center one of said three bridges.

* * * * *

UNITED STATES PATENT AND TRADEMARK OFFICE
CERTIFICATE OF CORRECTION

PATENT NO. : 6,589,433 B2  
DATED : July 8, 2003  
INVENTOR(S) : Albert M. Leung Page 1 of 1

It is certified that error appears in the above-identified patent and that said Letters Patent is hereby corrected as shown below:

Column 5,  
Line 11, "of" should read -- off --;  
Line 55, "$V=\alpha_z T$" should read -- $V=\alpha_s T$ --;  
Line 56, "$\alpha_8$" should read -- $\alpha_s$ --;

Column 6,  
Line 20, "$V_{2,1}\alpha_\alpha (T_8+T_9+T_{10}-T_{11}-T_{12}-T_{13})$" should read -- $V_{2,1}=\alpha_\alpha (T_8+T_9+T_{10}-T_{11}-T_{12}-T_{13})$ --;  
Line 22, "$T_i$" should read -- where $T_i$ --;  
Line 32, "$V_{2,1}=N\alpha_c (T_2-T_1)$" should read -- $V_{2,1}=N\alpha_s (T_2-T_1)$ --;  
Line 56, "$V_{2,1}V_{29}+V_{30}+V_{31}-V_{32}-V_{33}-V_{34}+V_{26}+V_{27}+V_{28}-V_{23}-V_{24}-V_{25}$" should read -- $V_{2,1}=V_{29}+V_{30}+V_{31}-V_{32}-V_{33}-V_{34}+V_{26}+V_{27}+V_{28}-V_{23}-V_{24}-V_{25}$ --;  
Line 59, "$V_{2,1}=N\alpha_\alpha (T_2+T_3-T_1-T_4)$" should read -- $V_{2,1}=N\alpha_s (T_2+T_3-T_1-T_4)$ --;  
Line 66, $V_{2,1}=N\alpha_5 (T_2-T_1)$" should read -- $V_{2,1}=N\alpha_s (T_2-T_1)$ --;

Column 7,  
Line 7, "$V_{2,1}=N\alpha_c (T_2-T_1)$" should read -- $V_{2,1}=N\alpha_s (T_2-T_1)$ --;  
Line 35, "$V_2=V_8+V_9+V_{10}=\alpha_8 (T_8+T_9+T_{10}) =N\alpha_c T_2$" should read -- $V_2=V_8+V_9+V_{10}=\alpha_s (T_8+T_9+T_{10}) =N\alpha_s T_2$ --;  
Line 42, "$V_1=N\alpha_z T_1$" should read -- $V_1=N\alpha_s T_1$ --;  
Line 49, "$V_{2,1}=N\alpha_\varepsilon (T_2-T_1)$" should read -- $V_{2,1}=N\alpha_s(T_2-T_1)$ --;  
Line 56, "wafer 16." should read -- wafter 15. --;

Column 8,  
Line 10, "sued" should read -- used --; and

Column 9,  
Line 14, "as" should read -- are --.

Signed and Sealed this

Twelfth Day of October, 2004

JON W. DUDAS  
*Director of the United States Patent and Trademark Office*

UNITED STATES PATENT AND TRADEMARK OFFICE
CERTIFICATE OF CORRECTION

PATENT NO.    : 6,589,433 B2
DATED         : July 8, 2003
INVENTOR(S)   : Albert M. Leung It is certified that error appears in the above-identified patent and that said Letters Patent is hereby corrected as shown below:

Column 5,
Line 11, "of" should read -- off --;
Line 55, "$V=\alpha_z T$" should read -- $V=\alpha_s T$ --;
Line 56, "$\alpha_8$" should read -- $\alpha_s$ --;

Column 6,
Line 20, "$V_{2,1}\alpha_\alpha (T_8+T_9+T_{10}-T_{11}-T_{12}-T_{13})$" should read -- $V_{2,1}=\alpha_s (T_8+T_9+T_{10}-T_{11}-T_{12}-T_{13})$ --;
Line 22, "$T_i$" should read -- where $T_i$ --;
Line 32, "$V_{2,1}=N\alpha_c (T_2-T_1)$" should read -- $V_{2,1}=N\alpha_s (T_2-T_1)$ --;
Line 56, "$V_{2,1}V_{29}+V_{30}+V_{31}-V_{32}-V_{33}-V_{34}+V_{26}+V_{27}+V_{28}-V_{23}-V_{24}-V_{25}$" should read -- $V_{2,1}=V_{29}+V_{30}+V_{31}-V_{32}-V_{33}-V_{34}+V_{26}+V_{27}+V_{28}-V_{23}-V_{24}-V_{25}$ --;
Line 59, "$V_{2,1}=N\alpha_\alpha (T_2+T_3-T_1-T_4)$" should read -- $V_{2,1}=N\alpha_s (T_2+T_3-T_1-T_4)$ --;
Line 66, $V_{2,1}=N\alpha_5 (T_2-T_1)$" should read -- $V_{2,1}=N\alpha_s (T_2-T_1)$ --;

Column 7,
Line 7, "$V_{2,1}=N\alpha_c (T_2-T_1)$" should read -- $V_{2,1}=N\alpha_s (T_2-T_1)$ --;
Line 35, "$V_2=V_8+V_9+V_{10}=\alpha_8 (T_8+T_9+T_{10}) =N\alpha_c T_2$" should read -- $V_2=V_8+V_9+V_{10}=\alpha_s (T_8+T_9+T_{10}) =N\alpha_s T_2$ --;
Line 42, "$V_1=N\alpha_z T_1$" should read -- $V_1=N\alpha_s T_1$ --;
Line 49, "$V_{2,1}=N\alpha_\varepsilon (T_2-T_1)$" should read -- $V_{2,1}=N\alpha_s(T_2-T_1)$ --;
Line 58, "wafer 16." should read -- wafer 15. --;

Column 8,
Line 10, "sued" should read -- used --; and

UNITED STATES PATENT AND TRADEMARK OFFICE
CERTIFICATE OF CORRECTION

PATENT NO. : 6,589,433 B2
DATED : July 8, 2003
INVENTOR(S) : Albert M. Leung

It is certified that error appears in the above-identified patent and that said Letters Patent is hereby corrected as shown below:

Column 9,
Line 14, "as" should read -- are --.

This certificate supersedes Certificate of Correction issued October 12, 2004.

Signed and Sealed this

Sixteenth Day of November, 2004

JON W. DUDAS
*Director of the United States Patent and Trademark Office*